Figure 1:
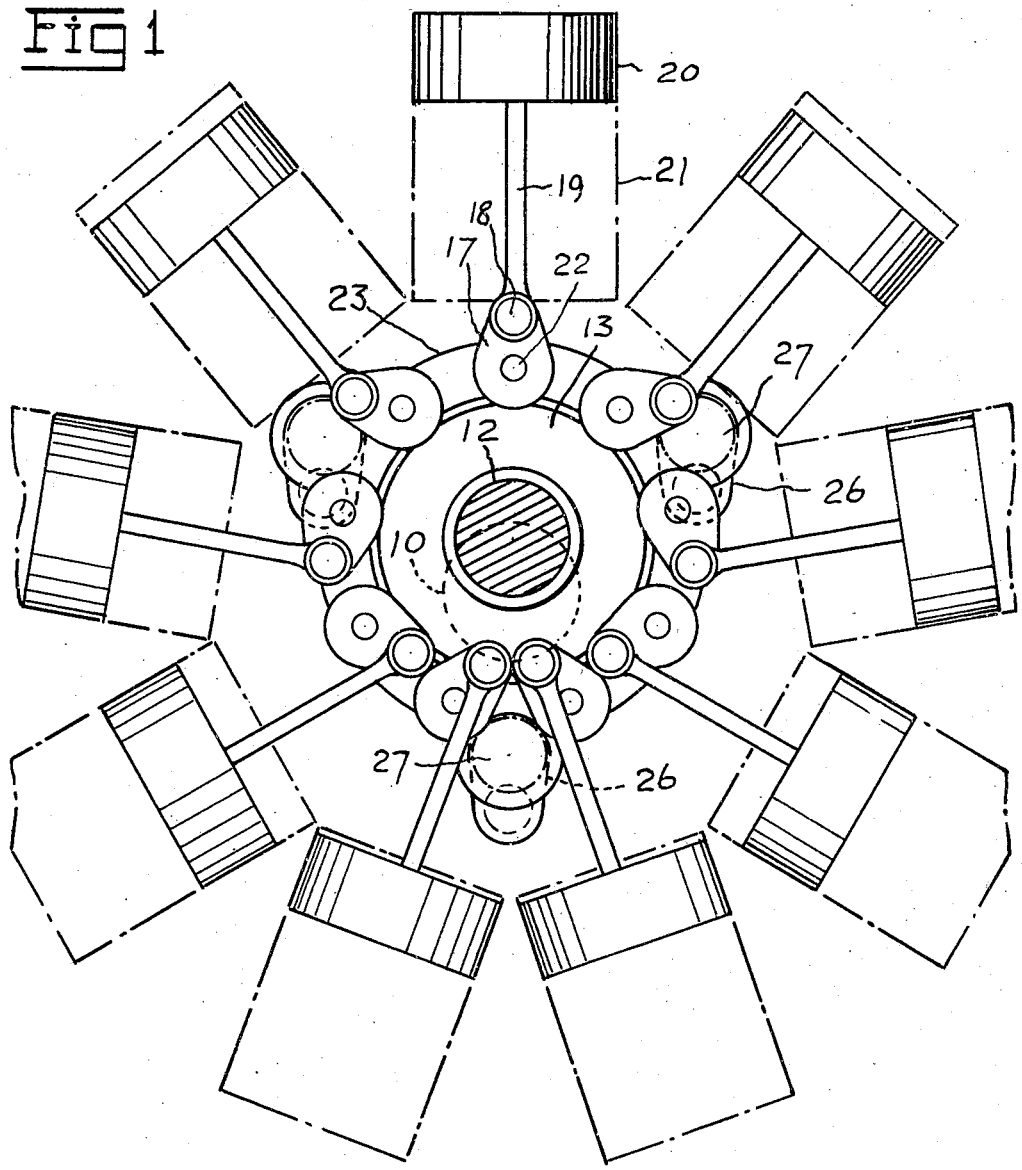

Oct. 25, 1949.                J. AIKEN                2,486,238
            CONNECTING ROD MECHANISM FOR ENGINES AND PUMPS
Filed June 7, 1946                                4 Sheets-Sheet 1

INVENTOR

James Aiken

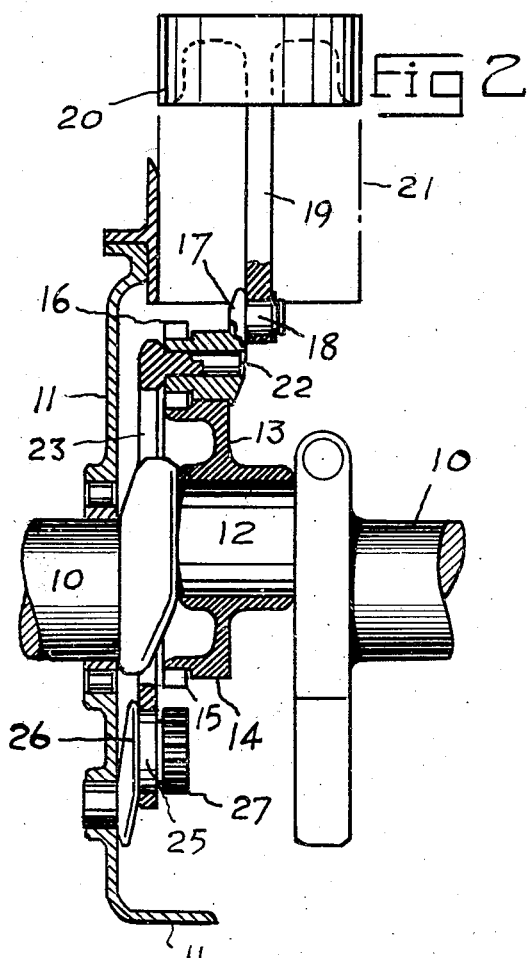
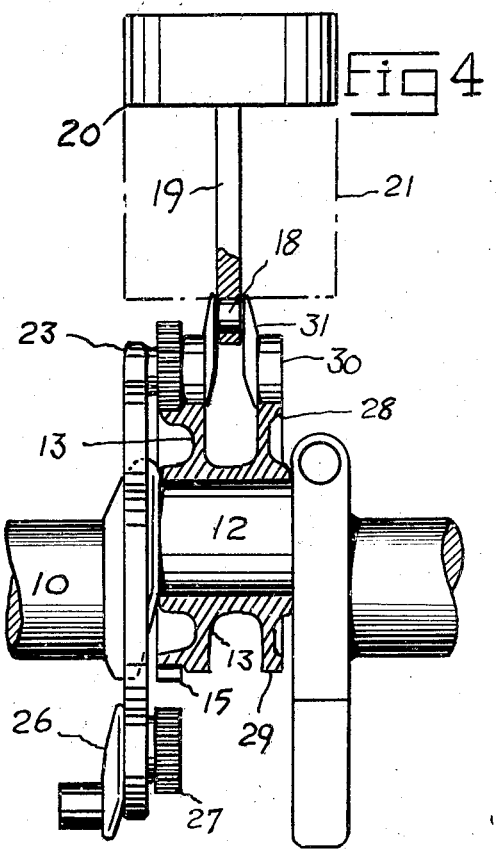
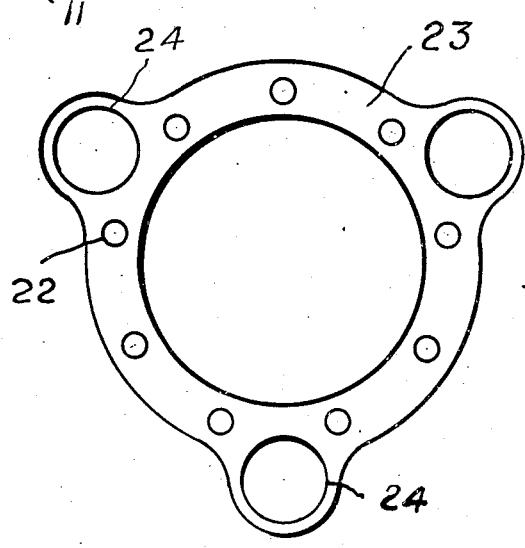

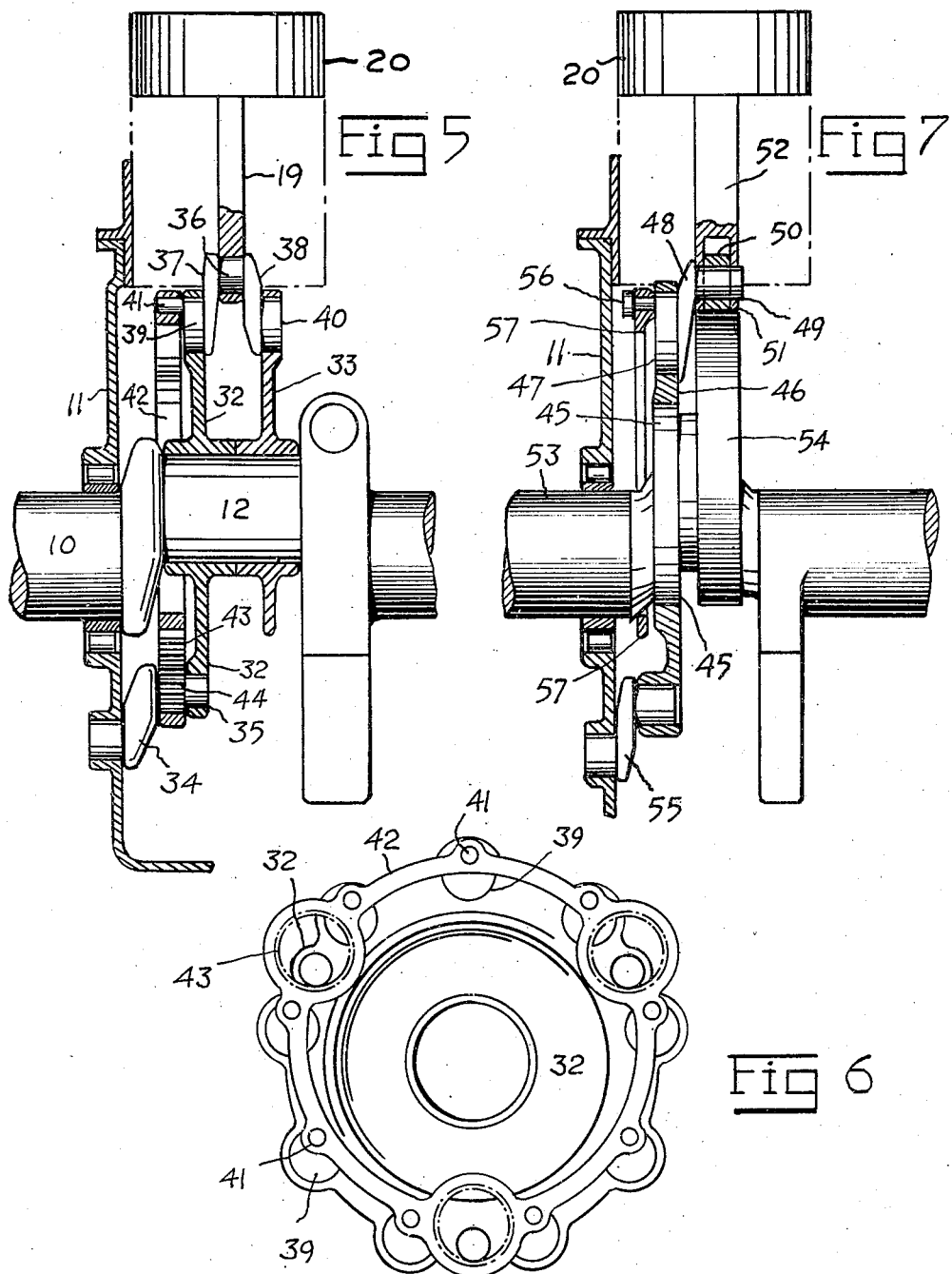

Oct. 25, 1949.    J. AIKEN    2,486,238
CONNECTING ROD MECHANISM FOR ENGINES AND PUMPS
Filed June 7, 1946    4 Sheets-Sheet 4

INVENTOR
James Aiken

Patented Oct. 25, 1949

2,486,238

UNITED STATES PATENT OFFICE 2,486,238

CONNECTING ROD MECHANISM FOR ENGINES AND PUMPS

James Aiken, Garden City, N. Y.

Application June 7, 1946, Serial No. 675,209

31 Claims. (Cl. 74—52)

This invention relates to connecting rod mechanism or power transmission means for reciprocating engines and pumps, and is applicable more particularly to engines or pumps of the radial type, although it may also be applied to engines or pumps having opposed cylinders and other cylinder arrangements.

One object of the invention is to provide an improved mechanism whereby a primary crank or eccentric co-operates with a secondary crank or eccentric whereby the connection to the piston is caused to move in a straight path. Another object is to eliminate side thrust on the cylinder walls so that the axial length of the piston and consequently of the cylinder may be considerably reduced with resultant reduction in cost, dimensions, and weight. Still another object is to reduce vibration and to obtain other advantages by cutting the crank throw to one half of that required for the same stroke with a conventional arrangement.

With these and other objects, in view, this invention consists in the novel construction, arrangement, and combination of parts hereinafter described with reference to the accompanying drawings which show, by way of illustration or example, parts of a number of radial internal combustion engines of the nine-cylinder type as extensively employed in aviation, but it will of course be obvious that the invention may, with equal advantage, be applied to such engines with seven, five, or other numbers of cylinders, or to engines with more than one bank of cylinders.

Figure 8:
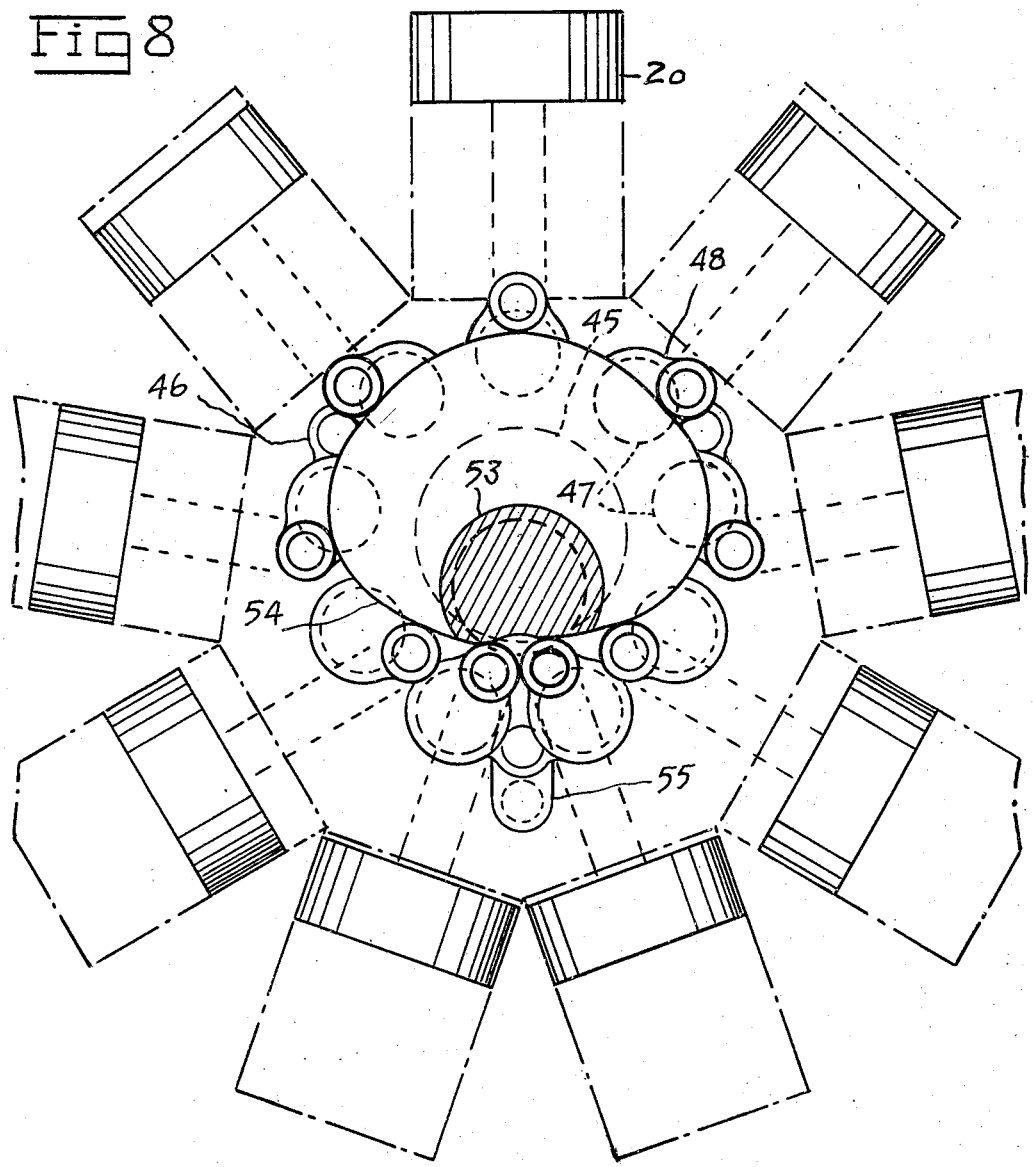

In the drawings:

Fig. 1 is an end view—partly in section—showing only the parts of the engine essential for an understanding of this invention; Fig. 2 is a section at right-angles to Fig. 1; Fig. 3 is a detail view of one of the parts of this engine; Fig. 4 is a view corresponding to Fig. 2 but showing a slightly modified form; Fig. 5 is a similar view but showing another form of the engine; Fig. 6 is a detail view of certain parts of the mechanism of the form shown at Fig. 5; and Figs. 7 and 8 are views corresponding to Figs. 2 and 1 respectively, but showing still another form of the invention.

Figs. 1, 2 and 3 show one form of the improved mechanism in which a shaft 10 is mounted in bearings in a casing 11 and has a crank pin 12 the throw of which is equal to only one fourth of the stroke of the engine. Rotatably mounted on the crank pin 12 is an annular member 13 having a smooth peripheral surface 14 flanked by a toothed ring 15 in mesh with the teeth of pinions 16 formed on secondary cranks 17 which roll upon the said surface 14 and have secondary crank pins 18 in bearings in the ends of rods 19 rigidly extending from the pistons 20 which reciprocate in the radial cylinders represented by the broken lines 21. The secondary crank members are held in engagement with the said annular member 13 and in properly spaced relation to each other by means of pins 22 which project from a ring 23 (Fig. 3) encircling the shaft 10, and while the primary crank-pin 12 and the ring 23 move in a circular path the secondary cranks 17 turn upon the pins 22 in the direction opposite to that of the primary crank, and as the secondary crank pin throw is exactly equal to the throw of the primary crank pin, each of the secondary crank pins 18 moves in a straight line and thus serves as an effective guide for the pistons without side pressure upon the cylinder walls. The ring 23 is formed with three openings 24 which serve as bearings for stud members 25 each of which extends from a crank 26 mounted in bearings in the engine casing 11, and formed integrally with each member 25 is a pinion 27 with a diameter equal to said pinions 16. Each pinion 27 meshes with two adjacent pinions 16 so that such meshing pinions 16 are caused to rotate in the same direction while pinions 16 not engaged by pinions 27 are caused to rotate by their engagement with the said toothed ring 15, thus ensuring accurately synchronised movement of all the cranks 17 and straight-line movement of all the piston-rods 19.

Fig. 4 shows a somewhat similar arrangement and the corresponding parts are designated by similar reference numerals. In this form, however, the annular member 13 is formed with an integral flange 28 having a smooth peripheral edge 29 to serve as a race for cylindrical studs 30 formed on cranks 31 rigidly secured in a convenient manner to the said secondary crank pins 18 so that power is transmitted at both sides of the piston rod.

Figs. 5 and 6 show a form of the invention in which annular members 32, 33 are mounted on the primary crank pin 12 and are caused to move in a circular orbit by the action of three—or other convenient number of—cranks 34 mounted in bearings in the engine casing 11 and having pins 35 that rotate in bearings in the member 32. The piston rod 19 rigidly connected to each piston 20 engages a secondary crank pin 36 carried by cranks 37, 38 having stud members 39, 40 mounted in the said annular members 32, 33 and the stud members 39 are provided with eccentric pins 41 (see Fig. 6) engaged by a ring 42 which latter is formed with an internally toothed member 43 in mesh with a toothed pinion 44 carried by each of the said cranks 34, and the number of teeth in each member 43 is exactly twice the number in each pinion 44, so that rotation of the cranks 34 causes the ring 42 to move in a circular path about the axes of the stud members 39 thereby causing the said bearing members to turn in a direction counter to the direction of rotation of the primary crank and as the crank throw of the primary crank pin 12 is exactly equal to that of the secondary crank pins 36 the direction of movement of each secondary crank pin 36 and of each piston rod 19 is straight and radial.

Figs. 7 and 8 show a form of the invention in which the primary crank pin takes the form of an eccentric member 45 which rotates within a ring member 46 having spaced bearings for rotary stud members 47 each of which has a crank 48 carrying a crank pin 49 having a roller 50 mounted thereon between forked ends 51 on the the piston rod 52. The said eccentric 45 is an integral part of the crank shaft 53 and also formed integrally therewith is a "heart" shaped cam 54 whose peripheral edge is engaged by the said rollers 50 as the cranks 48 all rotate in the same direction but opposite to the direction of rotation of the eccentric 45. The ring member 46 is linked to the casing 11 of the engine by cranks 55 and in order to ensure corresponding rotary movement of all the said stud members 47 pins 56 projecting eccentrically therefrom are all linked together by a ring 57 and all the rollers 50 are thus kept continuously in contact with the periphery of the cam 54.

Instead of the cranks 26, 34 and 55, other convenient or well known means may be employed for controlling the movement of the parts 23, 32 and 46 respectively, the object being to prevent such parts from rotating or rocking about their own axis while ensuring proper movement thereof in circular paths corresponding to the swing of the primary crank pins.

The embodiments of the invention illustrated in the drawings and described in the foregoing, have been chosen for the purpose of clearly setting forth the principles involved, and it will be apparent that many changes may be made in the construction, arrangement, and operation of the various parts as circumstances require or experience suggests without departing from the spirit of the invention within the scope of the appended claims.

What I claim is:

1. An engine or pump having a plurality of cylinders and having crank mechanism comprising a primary crank shaft, a primary crank pin carried by the shaft, an annular member encircling the axis of the crank pin, a plurality of secondary cranks mounted on said member on axes spaced from each other, means whereby the secondary cranks are all caused to turn in the same direction but in a direction opposite to the direction of rotation of the primary crank shaft, secondary crank pins carried by the secondary cranks and having orbits spaced outwardly from and around the orbit of the primary crank pin and having resultant straight line motion in a radial direction, and piston connecting members jointed to the said secondary crank pins.

2. An engine or pump having a plurality of radially disposed cylinders and having power transmission mechanism comprising means providing a primary crank throw equal to one fourth of the piston stroke, an annular series of means arranged in a common plane and each providing a secondary crank throw similar to the primary throw but by rotation in the opposite direction in orbits spaced around and outside the orbit of the primary crank means, an annular member carrying the secondary crank throw means and rotated in a circular path with the primary crank throw means, and connecting members between the pistons and the secondary crank throw means whereby the said members are moved in straight lines in radial directions.

3. An engine or pump of the radial cylinder type having power transmission means comprising a primary crank pin, an annular member mounted on the crank pin, a series of secondary cranks mounted all in the same plane on the annular member, secondary crank pins carried by the secondary cranks and rotating in circular paths spaced about and outside the orbit of the primary crank pin, means whereby all the secondary crank pins are turned in the same direction but counter to the rotation of the primary crank pin so that the resultant motion of each secondary crank pin is in a straight line parallel to its radial cylinder, and piston connecting means between each secondary crank pin and its piston.

4. An engine or pump of the radial cylinder type having power transmission means comprising a crank shaft, a primary eccentric member carried by the crank shaft, an annular member encircling the axis of the eccentric member, means whereby the annular member is caused to move in a circular orbit, a series of secondary eccentric members mounted in spaced relation to each other around the said annular member, and piston connecting means all arranged in one common plane and each connected to one of said secondary eccentric members.

5. In an engine or pump of the character described, power transmitting mechanism comprising a primary crank shaft, a primary crank pin carried thereby, an annular member mounted on the primary crank pin, rotary stud members all arranged in the same plane and mounted on the annular member in spaced relation to each other, secondary cranks all projecting at different angles from the said stud members, means whereby said stud members are all caused to turn in synchronism and counter to the direction of rotation of the primary crank shaft, secondary crank pins on the said secondary cranks, each secondary crank pin being caused to move in a radial line coinciding with the axis of one of the cylinders, and connecting means between each secondary crank pin and a piston.

6. In an engine or pump of the character described, power transmitting mechanism comprising a primary crank shaft, a primary crank pin carried thereby, an annular member mounted on the primary crank pin, rotary stud members all arranged in the same plane and mounted on the annular member in spaced relation to each other, auxiliary crank members whereby the rotary studs are caused to move in a circular path with said annular member, secondary cranks projecting from the stud members at different angles but all in the same plane, means whereby the studs are all caused to turn in synchronism and counter to the direction of rotation of the primary crank shaft, and connecting means between each secondary crank and a piston.

7. In an engine or pump of the character described, power transmitting mechanism comprising a primary crank shaft, a primary crank pin carried thereby, an annular member mounted on the primary crank pin, rotary stud members all arranged in the same plane and mounted on the annular member in spaced relation to each other, secondary cranks all disposed in the same plane and all projecting at different angles from the stud members, secondary crank pins carried by the secondary cranks and each having an orbit spaced from and outside the orbit of the primary crank pin, and connecting means between each secondary crank and a piston.

8. An engine or pump having a plurality of cylinders disposed around a shaft having power transmission means comprising, a primary crank pin, an annular member mounted on the crank pin, a plurality of secondary crank members mounted so as to roll upon the periphery of said annular member, means whereby the secondary crank members are all rotated in the same direction counter to the rotation of the primary crank pin, and piston connecting means between each piston and a secondary crank member.

9. An engine or pump having a plurality of cylinders disposed around a shaft having power transmission means comprising, a primary crank pin, an annular member mounted on the crank pin, a plurality of secondary crank members mounted on the annular member, a ring retaining the said secondary crank members in spaced relation to each other, anchored means restricting movement of said ring to a circular orbit, toothed gearing on the anchored means, on the secondary crank members, and on the said annular member whereby the secondary crank members are all rotated in the same direction counter to the rotation of the primary crank and whereby the annular member is caused to rotate upon the primary crank pin, and connecting means between the pistons and said secondary crank members.

10. In an engine or pump of the character described, a primary crank pin, a rotary annular member thereon, a ring free to gyrate in a circular path with the primary crank pin, a plurality of secondary crank members each comprising a cylindrical portion for rolling contact with the periphery of said annular member, means on said ring to retain the secondary crank members in spaced relation to each other, gear means on the annular member and on the secondary crank members ensuring rotary movement of the periphery of the rotary annular member at the same surface speed as the contacting cylindrical surfaces of the secondary crank members, and connecting means between each secondary crank member and a piston.

11. In an engine or pump of the character described, a primary crank pin, a rotary annular member thereon, a ring free to gyrate in a circular path with the primary crank pin, a plurality of secondary crank members each comprising a cylindrical portion for rolling contact with the periphery of said annular member, means on said ring to retain the secondary crank members in spaced relation to each other, gear means on the annular member and on the secondary crank members ensuring rotary movement of the periphery of the rotary annular member at the same surface speed as the contacting cylindrical surfaces of the secondary crank members, anchored crank means preventing the said ring from rotating about its own axis, gears on said anchored crank means meshing with the gear means on at least certain of the secondary crank members whereby the latter are caused to rotate in the same direction but counter to the rotation of the primary crank pin, and connecting means between each secondary crank member and a piston.

12. In an engine or pump of the character described, a primary crank pin, a rotary annular member thereon, a ring free to gyrate in a circular path with the primary crank pin, a plurality of secondary crank members each comprising a cylindrical portion for rolling contact with the periphery of said annular member, means on said ring to retain the secondary crank members in spaced relation to each other, gear means on the annular member and on the secondary crank members ensuring rotary movement of the periphery of the rotary annular member at the same surface speed as the contacting cylindrical surfaces of the secondary crank members, a crank pin projecting from each secondary crank member, another secondary crank supporting the end of each of such crank pins, means projecting from the pistons and engaging said crank pins, and annular means on the said annular member for engaging the said supporting cranks.

13. In an engine or pump of the character described, power transmission mechanism comprising a primary shaft, a primary crank pin carried thereby, an annular member on the crank pin, rotary stud members spaced from each other on said member, a secondary crank on each stud member, a plurality of anchored auxiliary cranks, crank pins on said auxiliary cranks engaging the said annular member to cause movement of said annular member in a circular orbit, a ring member connected eccentrically to each stud for rotating the said stud members all in the same direction and counter to the direction of rotation of the primary crank pin, and connecting means between each secondary crank and a piston.

14. In an engine or pump of the character described, power transmission mechanism comprising a primary shaft, a primary crank pin carried thereby, an annular member on the crank pin, rotary stud members spaced from each other on said member, a secondary crank on each stud member, a plurality of anchored auxiliary cranks, crank pins on said auxiliary cranks engaging the said annular member to cause movement of said member in a circular orbit, a ring member encircling the axis of the primary crank pin and jointed eccentrically to said stud members whereby gyration of the ring member in a circular path causes all the said stud members to rotate in the same direction, means whereby rotation of the auxiliary cranks imparts said gyratory movement to the said ring member, and connecting means between each secondary crank and a piston.

15. In an engine or pump of the character described, power transmission mechanism comprising a primary shaft, a primary crank pin carried thereby, an annular member on the crank pin, rotary stud members spaced from each other on said member, a secondary crank on each stud member, a plurality of anchored auxiliary cranks, crank pins on said auxiliary cranks engaging the said annular member to cause movement of said member in a circular path, a ring member cooperating with said auxiliary cranks whereby rotation of the said cranks in one direction causes the ring member to gyrate in a counter direction through a circular path, means jointing each of the said stud members eccentrically to the ring member whereby the said movement of the ring member causes the stud members to turn in the annular member in a direction counter to the direction of rotation of the primary crank pin and of the auxiliary cranks so that the free ends of the secondary cranks each move in a straight line in a radial direction, and means connecting each secondary crank to a piston.

16. In an engine or pump of the character described, power transmission mechanism comprising a primary shaft, a primary crank pin carried thereby, an annular member on the crank pin, rotary stud members spaced from each other on said member, a secondary crank on each stud member, a secondary crank pin on each secondary crank, means engaging the said annular member to cause movement thereof in a circular orbit, a ring member encircling the axis of the primary crank pin, means connecting each stud member eccentrically to said ring to ensure synchronous rotary movement of all the stud members, means connecting each secondary crank pin with a piston, a roller on each secondary crank pin, and a shaped cam carried by the primary crank shaft and having its peripheral edge constantly engaged by all the said rollers.

17. In an engine or pump of the character described, power transmission mechanism comprising a primary shaft, a primary crank pin carried thereby, an annular member on the crank pin, rotary stud members spaced from each other on said member, a secondary crank on each stud member, a secondary crank pin projecting from each secondary crank, a plurality of anchored cranks, crank pins projecting therefrom and engaging the said annular member to cause movement thereof in a circular path, an eccentric pin on each of said stud members, means connecting all said eccentric pins to ensure synchronous turning movement of all said stud members, a heart-shaped cam on the primary shaft, freely rotating rollers mounted on the secondary crank pins and contacting continuously with the peripheral edge of said cam, and means connecting each secondary crank pin with a piston.

18. In power transmission means for engines or pumps of the character described, crank mechanism comprising a central primary crank shaft, a plurality of secondary crank members disposed in one common plane in a circular series about and spaced radially from the primary crank shaft, crank pins carried by the secondary crank members, means whereby the secondary crank members are caused to rotate synchronously with the primary crank shaft and whereby the said crank pins are caused to move in radial directions, and connecting means between said secondary crank pins and the pistons.

19. In power transmission means for engines or pumps of the character described, crank mechanism comprising a central primary crank shaft, a plurality of secondary crank members disposed in one common plane in a circular series about the primary crank shaft and spaced radially therefrom, a primary crank pin carried by the primary crank shaft, crank pins carried by the secondary crank members and moving in orbits disposed around the primary crank pin and having axes moved in orbits spaced around the primary crank shaft axis, and means whereby the secondary crank members are rotated in synchronism with the primary crank shaft and whereby the resultant movement of each secondary crank pin is in a radial direction, and connecting means between said secondary crank pins and the pistons.

20. A piston engine or pump of the character described, comprising a primary eccentric member moving in a centrally disposed orbit, a plurality of secondary eccentric members, means whereby said members are rotated in synchronism with the said primary member in a common plane in orbits with their centers spaced outwardly from the central orbit, and means connecting each secondary member to a piston, the resultant movement of each secondary member being in a straight line.

21. A piston engine or pump of the character described, comprising a central shaft, an annulus encircling the shaft, means whereby the annulus is maintained in unvarying angular position and is caused to gyrate in a circular orbit, a plurality of cranks angularly spaced from each other around the annulus and having crank pins with orbits spaced radially away from the shaft, means whereby said cranks are rotated synchronously with the central shaft, cylinders disposed around the shaft, pistons in the cylinders, and means connecting each crank pin with a piston, each crank pin moving in a line coinciding with the axis of its cylinder.

22. A piston engine or pump of the character described, comprising a central shaft an annulus encircling the shaft, means whereby the annulus is maintained in unvarying angular position and is caused to gyrate in a circular orbit, a plurality of crank pins, means whereby the crank pins are caused to gyrate in orbits spaced from each other, means whereby said crank pins are actuated in synchronism with the central shaft, means interconnecting said crank pins and annulus, and means connecting each crank pin to a piston.

23. A piston engine or pump of the character described, comprising a central shaft, an annulus encircling the shaft, means whereby the annulus is maintained in unvarying angular position and is caused to gyrate in a circular orbit, a plurality of cranks carried by the annulus means whereby each crank is caused to rotate in synchonism with the central shaft and in a circular orbit spaced outwardly from said shaft whereby the crank pin of each crank is reciprocated in a path at one side of said shaft.

24. A piston engine or pump of the character described, comprising a central shaft, a primary eccentric member carried by the shaft, a plurality of studs disposed around said member in one common plane and angularly spaced from each other and from the axis of said member, secondary eccentric members carried by said studs, means connecting each secondary member to a piston, and means whereby the primary and secondary members are all caused to move in synchonism with but in separate circular orbits and whereby the movement of the secondary members is counter to that of the primary member, and the resultant movement thus imparted to each secondary member is in a straight line.

25. Crank mechanism of the character described, comprising a primary crank pin, a plurality of secondary cranks having their centers of rotation spaced from each other around said crank pin, secondary crank pins carried by the secondary cranks, and means whereby the secondary cranks are rotated in synchronism with the primary crank pin and whereby the secondary crank pins are moved in straight lines disposed in one common plane without intersecting each other.

26. A motion transmitting mechanism of the character described, comprising a primary eccentric member, a plurality of rotary members having axes each spaced radially from said member a distance greater than the eccentricity of said member, means whereby the said rotary members are all rotated in synchronism with the primary eccentric member, a secondary eccentric member on each of said rotary members, and means whereby the secondary eccentric members are caused to move in straight lines spaced from each other.

27. An engine or pump comprising a fixed casing, a plurality of cylinders therein, a central shaft, a primary eccentric part on the shaft, two annular independently moving members encircling the axis of the eccentric part, a stud corresponding to each cylinder, said studs being spaced from each other around one of said annular members and being carried thereby, a secondary eccentric member carried by each stud, a piston connected to each secondary eccentric member, and anchoring means connected to the fixed casing and causing one of said annular members to impart rotary movement to said studs synchronously with but counter to the rotation of the central shaft, and insuring straight-line motion of each piston.

28. An engine or pump comprising a fixed casing, a plurality of cylinders mounted on the casing, a main shaft in the casing, a primary eccentric part on the shaft, an annular member mounted on the eccentric part, a second but relatively moving annular member spaced from the eccentric part and encircling the axis thereof, a secondary eccentric corresponding to each cylinder, said secondary eccentrics being mounted in spaced relation to each other upon one of said annular members, a piston connected to each secondary eccentric, and crank means anchored to said fixed casing and causing one of said annular members to rotate the said secondary eccentrics with resultant straight-line motion.

29. An engine or pump comprising a fixed casing, a shaft therein, a plurality of fixed cylinders radiating from the casing, a primary eccentric part on the shaft, two independently moving annular members encircling the axis of said eccentric part, secondary rotary devices spaced radially from the axis of said eccentric part and mounted in spaced relation to each other on one of said annular members, an eccentric carried by each rotary device, a piston connected to each eccentric, and means on one of said annular members insuring synchronous rotation of said rotary devices.

30. Crank mechanism of the character described comprising a fixed casing, a primary eccentric in the casing, an annular member mounted on said eccentric, a second annular member encircling the axis of said eccentric, a plurality of bearings carried by one of said annular members in one common plane and in radially spaced relation to the eccentric, a secondary eccentric carried by each of said bearingss, means movably connecting one of said annular members to the fixed casing, and means whereby one of said annular members is caused to move relatively to the movement of the other annular member to impart synchronous rotary movement to said secondary eccentrics.

31. Crank mechanism of the character described comprising a fixed casing, a primary eccentric therein, an annular member mounted on the eccentric, a second annular member encircling the eccentric, spaced bearing means on one of the annular members, secondary eccentrics mounted in said bearing means in one common plane, anchoring means held by the casing and causing movement of one of said annular members in relation to the other and causing movement of the secondary eccentrics in straight lines.

JAMES AIKEN.

REFERENCES CITED

The following references are of record in the file of this patent:

UNITED STATES PATENTS

| Number | Name | Date |
|---|---|---|
| 1,383,308 | Johnson | July 5, 1921 |
| 1,579,083 | Collins | Mar. 30, 1926 |

FOREIGN PATENTS

| Number | Country | Date |
|---|---|---|
| 175,753 | Switzerland | Mar. 15, 1935 |